United States Patent [19]
Bereiter

[11] Patent Number: 5,875,306
[45] Date of Patent: Feb. 23, 1999

[54] RECONFIGURING COMPUTER RESOURCES IN A DISTRIBUTED COMPUTER ENTERPRISE ENVIRONMENT

[75] Inventor: Thomas W. Bereiter, Austin, Tex.

[73] Assignee: International Business Machines Corporation, Armonk, N.Y.

[21] Appl. No.: 724,661

[22] Filed: Oct. 1, 1996

[51] Int. Cl.⁶ .............................. H04B 3/00; H04J 13/00
[52] U.S. Cl. .................................. 395/200.5; 395/200.56; 395/200.54
[58] Field of Search .................... 395/200.5, 200.51, 395/200.52, 200.53, 200.56, 200.57, 200.58, 200.59; 370/913, 310, 338

[56] References Cited

U.S. PATENT DOCUMENTS

| | | |
|---|---|---|
| H1641 | 4/1997 | Sharman .................................. 370/338 |
| 4,885,770 | 12/1989 | Croll . |
| 5,113,495 | 5/1992 | Uehara .................................. 395/200.5 |
| 5,146,568 | 9/1992 | Flaherty et al. . |
| 5,280,627 | 1/1994 | Flaherty et al. . |
| 5,325,529 | 6/1994 | Brown et al. . |
| 5,390,324 | 2/1995 | Burckhartt et al. . |
| 5,408,618 | 4/1995 | Aho et al. . |
| 5,450,576 | 9/1995 | Kennedy . |
| 5,452,454 | 9/1995 | Basu . |
| 5,504,746 | 4/1996 | Meier .................................... 370/338 |
| 5,511,208 | 4/1996 | Boyles et al. . |
| 5,550,981 | 8/1996 | Bauer et al. .......................... 395/200.5 |
| 5,572,528 | 11/1996 | Shuen .................................. 370/338 |
| 5,574,860 | 11/1996 | Perlman et al. ....................... 395/200.5 |
| 5,594,731 | 1/1997 | Reissner ................................ 370/338 |
| 5,652,908 | 7/1997 | Douglas et al. ...................... 395/200.5 |
| 5,659,544 | 8/1997 | La Porta et al. ....................... 370/338 |

OTHER PUBLICATIONS

IBM Technical Disclosure Bulletin "LAN Transport Support for OS/2 2.0 Maintenance System and Configuration/Installation/Distribution," vol. 37, No. 04B, Apr. 1994.

IBM Technical Disclosure Bulletin "Router Automatic Link Re–Establishment Process," vol. 36 No. 07, Jul. 1993

IBM Technical Disclosure Bulletin "Local Area Network Diagnostics for a Remote Program Load Environment," vol. 37, No. 03, Mar. 1994.

*Primary Examiner*—Nabil Hindi
*Attorney, Agent, or Firm*—Jeffrey S. LaBaw; David H. Judson

[57] ABSTRACT

A large distributed enterprise includes computing resources that are organized into one or more managed regions, each region being managed by a management server servicing one or more gateway machines, with each gateway machine servicing a plurality of endpoint machines. Upon power-up, an endpoint machine attempts to connect to its last known gateway. If the connection fails, the endpoint machine broadcasts a boot request with an extension unique to the management server but that is ignored by other servers in the network, including a boot server that would normally handle the boot request. The management server responds to the boot request by assigning the endpoint to a new host gateway.

20 Claims, 5 Drawing Sheets

5,875,306

RECONFIGURING COMPUTER RESOURCES IN A DISTRIBUTED COMPUTER ENTERPRISE ENVIRONMENT

TECHNICAL FIELD

The present invention is directed to managing a large distributed computer enterprise environment and, more particularly, to dynamically reconfiguring the environment as resources are moved in and out of the network.

BACKGROUND OF THE INVENTION

It is known in the art to connect computers in a large, geographically-dispersed network environment and to manage such environment in a distributed manner. One such management framework consists of a server that manages a number of nodes, each of which has a local object database that stores object data specific to the local node. Each managed node typically includes a management framework, comprising a number of management routines, that is capable of a relatively large number (e.g., hundreds) of simultaneous network connections to remote machines. The framework manages hundreds of megabytes of local storage and can spawn many dozens of simultaneous processes to handle method requests from local or remote users. This amount of power, however, is quite costly. Each managed node requires upwards of a megabyte of local memory of disk plus a permanent TCP/IP connection. If a managed node sees heavy use, then such costs go up considerably. Moreover, as the number of managed nodes increases, the system maintenance problems also increase, as do the odds of a machine failure. When a machine is replaced, the old machine state must be located and restored.

The problem is exacerbated in a typical enterprise as the node number rises. Of these nodes, only a small percentage are file servers, name servers, database servers, or anything but end-of-wire or "endpoint" machines. The majority of the network machines are simple personal computers ("PC's") or workstations that see little management activity during a normal day. Nevertheless, the management routines on these machines are constantly poised, ready to handle dozens of simultaneous method invocations from dozens of widespread locations, invocations that rarely occur.

Today, companies desire to place all of their computing resources on the company network. Traditionally, the networks are TCP/IP networks. This protocol was designed almost 30 years ago, at a time when estimates of numbers of interconnected machines was relatively low. Today, the TCP/IP address space is running out of room. A typical company has a class "B" network that is configured to have a maximum of about 250 hosts per subnet. The scarcity Of network addresses has made it clear that assigning a fixed IP address to each computing resource will not be possible for much longer. Moreover, there is the problem that computers now tend to move. A laptop may be on the user's desk in the morning, but that afternoon may be plugged into the conference room subnet to drive a video presentation. With fixed addresses, each move requires system administration attention to reconfigure the network.

Moreover, the problem of keeping a distributed management framework connected is a continuous job. Any number of everyday actions can sever a connection. Whenever a network address is changed, a machine moved from location to location, or a hostname is changed, any cached location information in the system management framework becomes stale. Network reconfiguration is thus a frequent action which administrators do not wish to perform manually. The problem is bad enough with workstations, but with roaming PC's it is much worse.

There is therefore a need to provide methods for dynamically reconfiguring a managed enterprise environment having up to thousands or tens of thousands of nodes as computer resources, especially endpoints, are moved in and out of the network.

BRIEF SUMMARY OF THE INVENTION

It is a primary object of the invention to effectively manage computing resources in a large distributed enterprise environment.

It is another object of the invention to enable an enterprise to place substantially all of its computing resources on a network that is managed in a reliable, cost-effective manner.

It is a further object to allow low-level computing resources, such as end-of-wire or "endpoint" machines, to be easily installed or reconfigured into a large managed network environment.

It is still another important object of the invention to automatically maintain an endpoint machine in an operating state within a distributed managed environment despite relocation of the machine within the environment.

It is still another object to reduce the complexity and cost of systems management in a large enterprise environment by automatically reconfiguring endpoint machines that are unable to connect to their last known management gateway.

Yet another object is to enhance the flexibility of management frameworks used to manage large, distributed enterprise environments by enabling endpoint machines to automatically locate new gateway hosts upon certain conditions.

A more specific object of the invention is to implement a reconfiguration mechanism in an endpoint machine to enable the machine to locate a new management gateway upon movement of the machine, failure of a last known gateway, a network reconfiguration, or loss or failure of endpoint configuration files.

It is still another object of the invention to meet the needs of customers with very large and geographically-dispersed networks and, more particularly, to significantly expand the automatic reconfiguration capabilities of the network. BY enabling automatic reconfiguration, the number of expert system administrators may be conveniently reduced.

Yet another important object is to enable more efficient PC connectivity and reconfiguration in a large centrally-managed network enterprise.

It is a preferred object of the invention to reconfigure endpoint machines within a dynamic network environment. Upon power-up, an endpoint machine attempts to connect to its last known gateway. If the connection fails, the endpoint machine broadcasts a boot request with an extension unique to a management server but that is ignored by other servers in the network, including a boot server that would normally handle the boot request. The management server responds to the boot request by assigning the endpoint to a new host gateway.

These and other objects are achieved in a large distributed enterprise that includes computing resources organized into one or more managed regions, each region being managed by a management server servicing one or more gateway machines, with each gateway machine servicing a plurality of endpoint machines. A system management framework is preferably "distributed" on the gateway machines and the one or more endpoint machines to carry out system management tasks. A method of reconfiguring the dynamic network environment is implemented, preferably upon power-up of each endpoint, by determining whether the endpoint machine can connect to a first gateway machine (preferably the endpoint's last known gateway, if one exists). If the endpoint machine cannot connect to the first gateway machine upon power-up, endpoint machine broadcasts a boot request with an extension unique to the management server and that is ignored by other servers in the network, including a boot server that would normally handle the boot request.

The management server receives the boot request (either directly or as a result of the boot request being passed thereto from a gateway machine that may have "heard" the request). In response, the management server records a current IP address of the endpoint machine and locates a new gateway machine for the endpoint based on the current IP address. Thereafter, the management server issues a notification to the endpoint machine identifying a location of the new gateway machine. As a result, the endpoint is assigned to the new gateway machine to facilitate system management tasks that are issued from a central authority (typically the management server or one of the gateways) and distributed to all endpoint machines in the managed region.

According to another feature of the invention, an endpoint computer connectable into such an enterprise includes a processor, an operating system, a graphical user interface, and a reconfiguration mechanism. The mechanism comprises means responsive to power-up of the computer for determining whether the computer can connect to a first gateway machine, means responsive to the determining means for broadcasting a boot request with an extension unique to the management server if the computer cannot connect to the first gateway machine upon power-up, and means responsive to information received from the management server for assigning the computer to a second gateway machine to facilitate execution of system management tasks within the managed region. The reconfiguration mechanism may also include means for delaying broadcast of the boot request by a random time so that multiple boot requests do not overload server resources. The reconfiguration mechanism may also be implemented in a computer program product.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
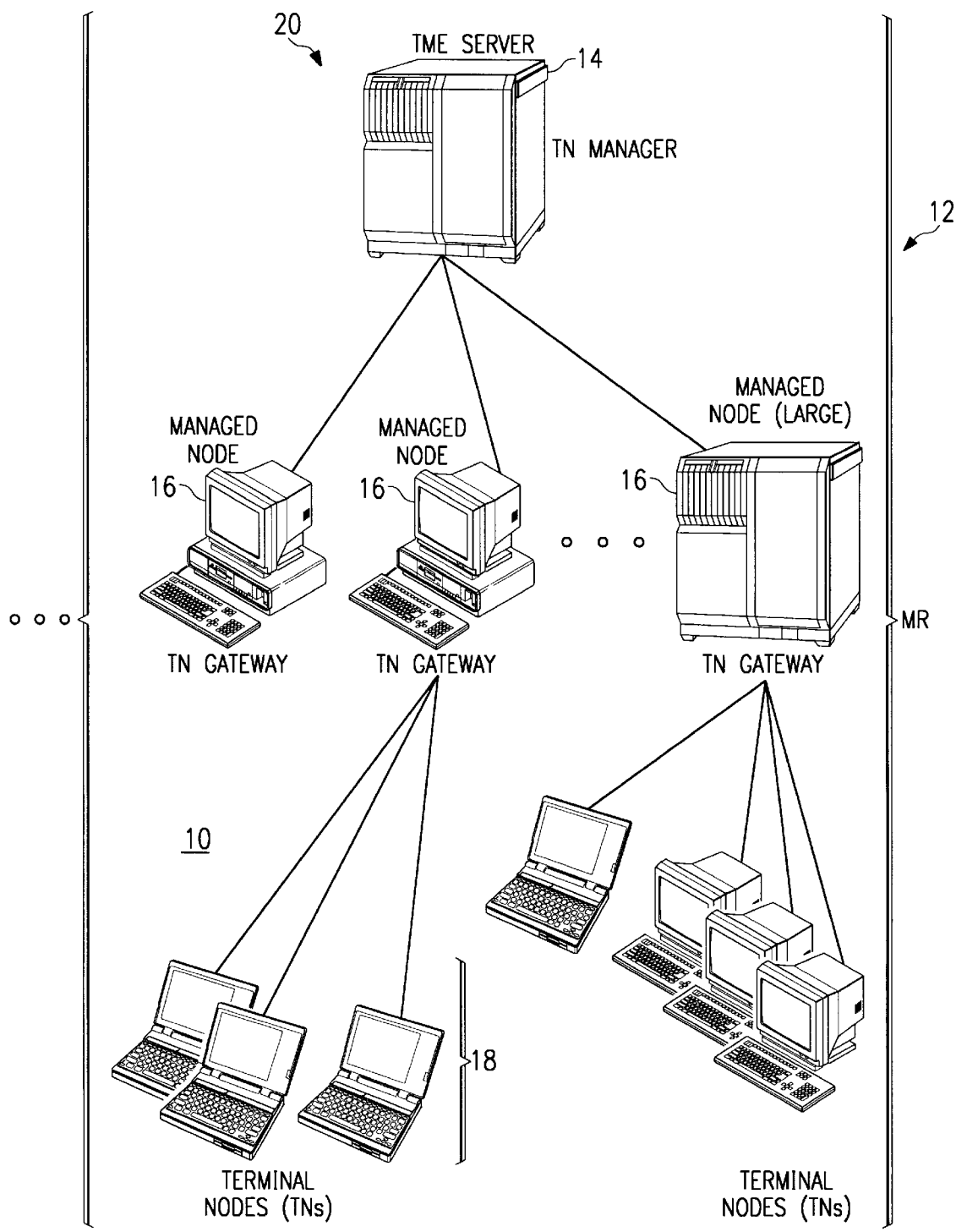
FIG. 1 illustrates a simplified diagram showing a large distributed computing enterprise environment in which the present invention is implemented.

Referring now to FIG. 1, the invention is preferably implemented in a large distributed computer environment 10 comprising up to thousands of "nodes." The nodes will typically be geographically dispersed and the overall environment is "managed" in a distributed manner. Preferably, the managed environment (ME) is logically broken down into a series of loosely-connected managed regions (MR) 12, each with its own management server 14 for managing local resources with the MR. The network typically will include other servers (not shown) for carrying out other distributed network functions. These include name servers, security servers, file servers, threads servers, time servers and the like. Multiple servers 14 coordinate activities across the enterprise and permit remote site management and operation. Each server 14 serves a number of gateway machines 16, each of which in turn support a plurality of endpoints 18. The server 14 coordinates all activity within the MR using a terminal node manager 20.

Figure 2:
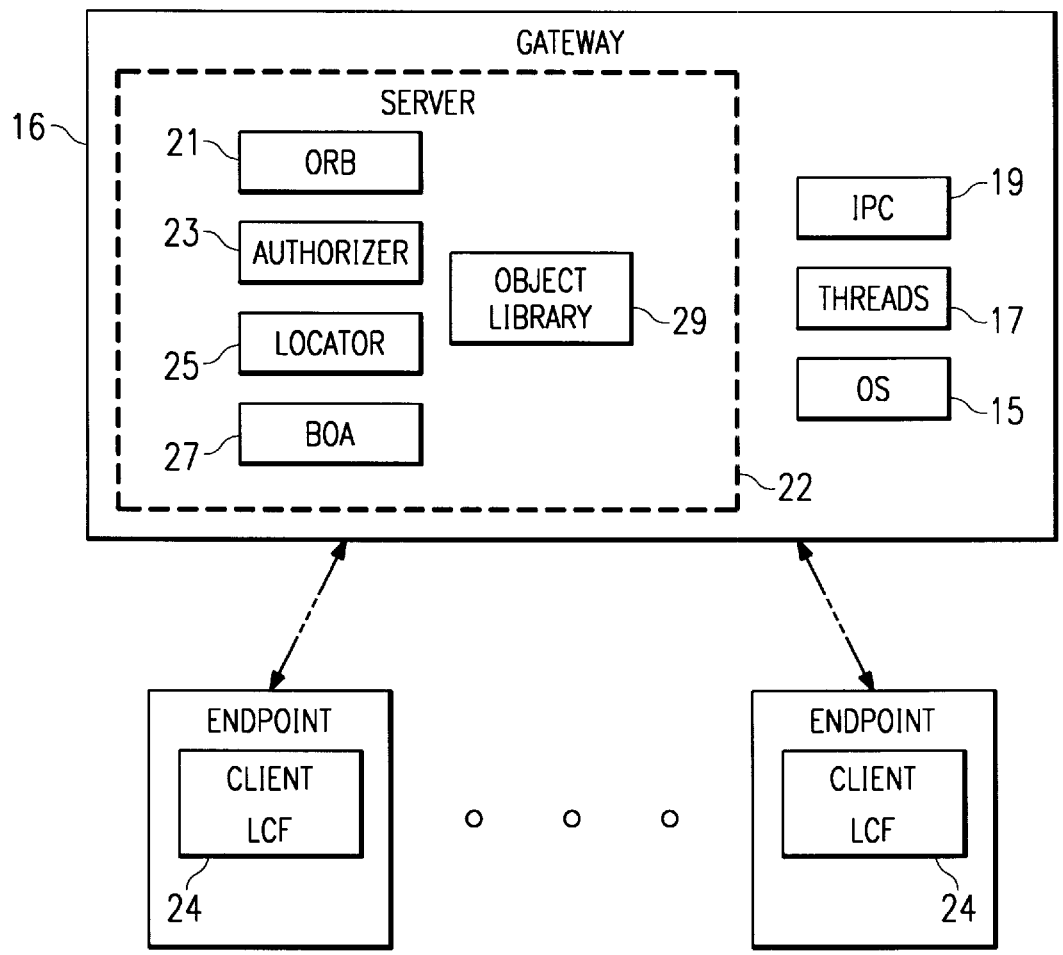
FIG. 2 is a block diagram of a preferred system management framework illustrating how the framework functionality is distributed across the gateway and its endpoints within a managed region.

Referring now to FIG. 2, each gateway machine 16 runs a server component 22 of a system management framework. The server component 22 is a multi-threaded runtime process that comprises several components: an object request broker or "ORB" 21, an authorization service 23, object location service 25 and basic object adaptor or "BOA" 27. Server component 22 also includes an object library 29. Preferably, the ORB 21 runs continuously, separate from the operating system, and it communicates with both server and client processes through separate stubs and skeletons via an interprocess communication (IPC) facility 19. In particular, a secure remote procedure call (RPC) is used to invoke operations on remote objects. Gateway machines 16 also includes an operating system 15 and a threads mechanism 17.

The system management framework includes a client component 24 supported on each of the endpoint machines 18. The client component 24 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like.

Figure 3:
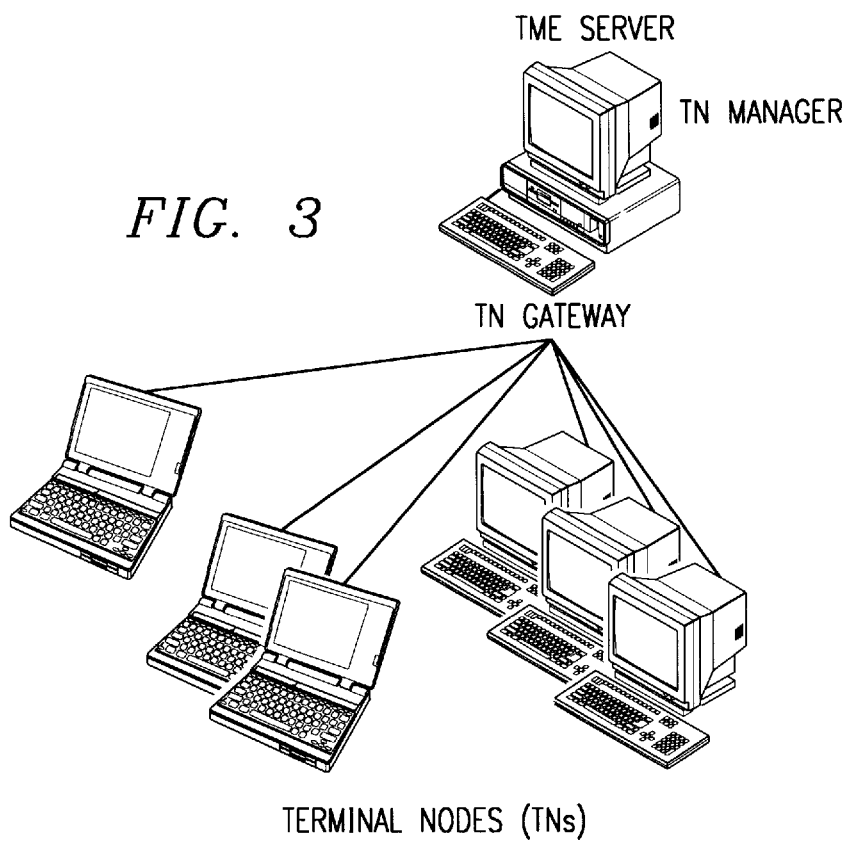
FIG. 3 illustrates a smaller "workgroup" implementation of the enterprise in which the server and gateway functions are supported on the same machine.

In the large enterprise such as illustrated in FIG. 1, preferably there is one server per MR with some number of gateways. For a workgroup-size installation (e.g., a local area network) such as illustrated in FIG. 3, a single server-class machine may be used as the server and gateway, and the client machines would run a low maintenance framework. References herein to a distinct server and one or more gateway(s) should thus not be taken by way of limitation as these elements may be combined into a single platform. For intermediate size installations the MR grows breadth-wise, with additional gateways then being used to balance the load of the endpoints.

The server is the top-level authority over all gateway and endpoints. The server maintains an endpoint list, which keeps track of every endpoint in a managed region. This list contains all information necessary to uniquely identify and manage endpoints including, without limitation, such information as name, location, and machine type. The server also maintains the mapping between endpoint and gateway, and this mapping is dynamic. Based on site-specific settings, it is possible to reassign endpoints when gateways go down or to automatically add new endpoints as they appear on the network.

As noted above, there are one or more gateways per managed region. A gateway is a full managed node that has been configured to operate as a gateway. Initially, a gateway "knows" nothing about endpoints. As endpoints login (discussed below), the gateway builds an endpoint list for its endpoints. The gateway's duties include: listening for endpoint login requests, listening for endpoint upcall requests, and (its main task) acting as a gateway for method invocations on endpoints.

Figure 2A:
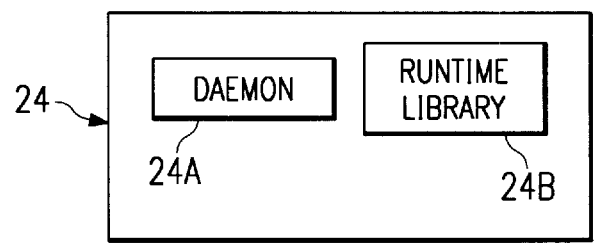
FIG. 2A is a block diagram of the elements that comprise the LCF client component of the system management framework.

As also discussed above, the endpoint is a machine running the system management framework client component, which is referred to herein as the low cost framework (LCF). The LCF has two main parts as illustrated in FIG. 2A: the lcf daemon 24*a* and an application runtime library 24*b*. The LCF daemon 24*a* is responsible for endpoint login and for spawning application endpoint executables. Once an executable is spawned, the LCF daemon 24*a* has no further interaction with it. Each executable is linked, with the application runtime library 24*b*, which handles all further communication with the gateway.

Preferably, the server and each of the gateways is a computer or "machine." For example, each computer may be a RISC System/6000® (a reduced instruction set or so-called RISC-based workstation) running the AIX (Advanced Interactive Executive) operating system, preferably Version 3.2.5 or greater. The AIX operating system is compatible at the application interface level with the UNIX operating system, version 5.2.

The various models of the RISK-based computers are described in many publications of the IBM Corporation, for example, *RISC System/6000, 7073 and 7016 POWERstation and POWERserver Hardware Technical Reference, Order No. SA23-2644-00*. The AIX operating system is described in *AIX Operating System Technical Reference*, published by IBM Corporation, First Edition (November, 1985), and other publications. A detailed description of the design of the UNIX operating system is found in a book by Maurice J. Bach, *Design of the Unix Operating System*, published by Prentice-Hall (1986). Suitable alternative machines include: an IBM-compatible PC486 or higher running Novell Unix-Ware 2.0, an AT&T 3000 series running AT&T UNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3. Of course, other machines and/or operating systems may be used as well for the gateway and server machines.

Each endpoint is also a computer. In one preferred embodiment of the invention, most of the endpoints are personal computers (e.g., desktop machines or laptops). In this architecture, the endpoints need not be high powered or complex machines or workstations. One or more of the endpoints may be a notebook computer, e.g., the IBM ThinkPad® machine, or some other Intel x86 or Pentium®-based computer running Windows 3.1 or greater operating system. IBM® or IBM-compatible machines running under the OS/2® operating system may also be implemented as the endpoints.

As noted above, the server-class framework running on each gateway machine is multi-threaded and is capable of maintaining hundreds of simultaneous network connections to remote machines. A thread of execution may be a separate process (in the UNIX paradigm) or a separate thread in a single process (in the POSIX pthreads paradigm). POSIX is a series of standards for applications and user interfaces to open systems, issued by the Institute of Electrical and Electronics Engineers Inc. (IEEE). The IEEE POSIX.1C is the emerging standard for user level multi-threaded programming and is implemented in the served component of the systems management framework. All objects in this framework exhibit "state." This state may be completely persistent, in which case it is represented by attributes in the object database associated with a gateway machine, or the state may be non-persistent. An example of the latter might be the current list of machines that are down.

An endpoint is added to the enterprise by first copying the LCF daemon 24*a* to the endpoint's disk. This may be done automatically through network login scripts, manually by inserting a diskette, or by preloading the boot disk at the time of purchase or license. The first time the LCF daemon is installed, and on each subsequent boot, the LCF daemon attempts to login to its gateway. If the gateway is not known or if the gateway does not respond, the daemon issues a broadcast requesting a gateway. For completely new endpoints the broadcast is ultimately forwarded to the server. If a gateway hears a broadcast or a login request from an endpoint it recognizes, the gateway services the request itself. When the server receives an endpoint's gateway request broadcast, the server consults its endpoint list to see which gateway the endpoint belongs to.

An endpoint preferably communicates only with its gateway. Requiring all endpoint communication to pass through a single gateway greatly simplifies connectivity issues. After a successful login, both endpoint and gateway know a working address by which to address one another. If a DHCP address lease expires, or anything changes in the network topology, then the next endpoint login will establish the new endpoint to gateway addresses.

There is no absolute maximum number of endpoints that can be supported by a single gateway. The design strategy is that the gateway is always in control of its own workload. The endpoints are not allowed to send data unless granted permission. When an endpoint has results to return, or if it wishes to make an upcall, it sends a very small message requesting service. The gateway queues the request and services the queue as time allows. When an endpoint has large results, it must break the results into chunks and may only send a chunk when instructed to do so. This strategy makes it possible for a single gateway to support thousands of endpoints, albeit somwhat slowly. If a better quality of service is desired, it is simply a matter of adding more gateways.

Endpoint methods are normal CORBA methods (as discussed below) linked with IDL compiler generated code and the endpoint application runtime library 24b. This results in a native executable designed to be spawned by the LCF daemon 24a. Any number of methods may be implemented in a single executable.

Preferably, an endpoint is installed without any methods. Method executables are downloaded from the gateway as required. When the LCF daemon receives a method invocation request, it checks the local disk cache. If there is a cache miss, or a version mismatch, then a new executable is downloaded. In this way, an endpoint can start with nothing and then build a working set of methods for fast execution.

Figure 4:
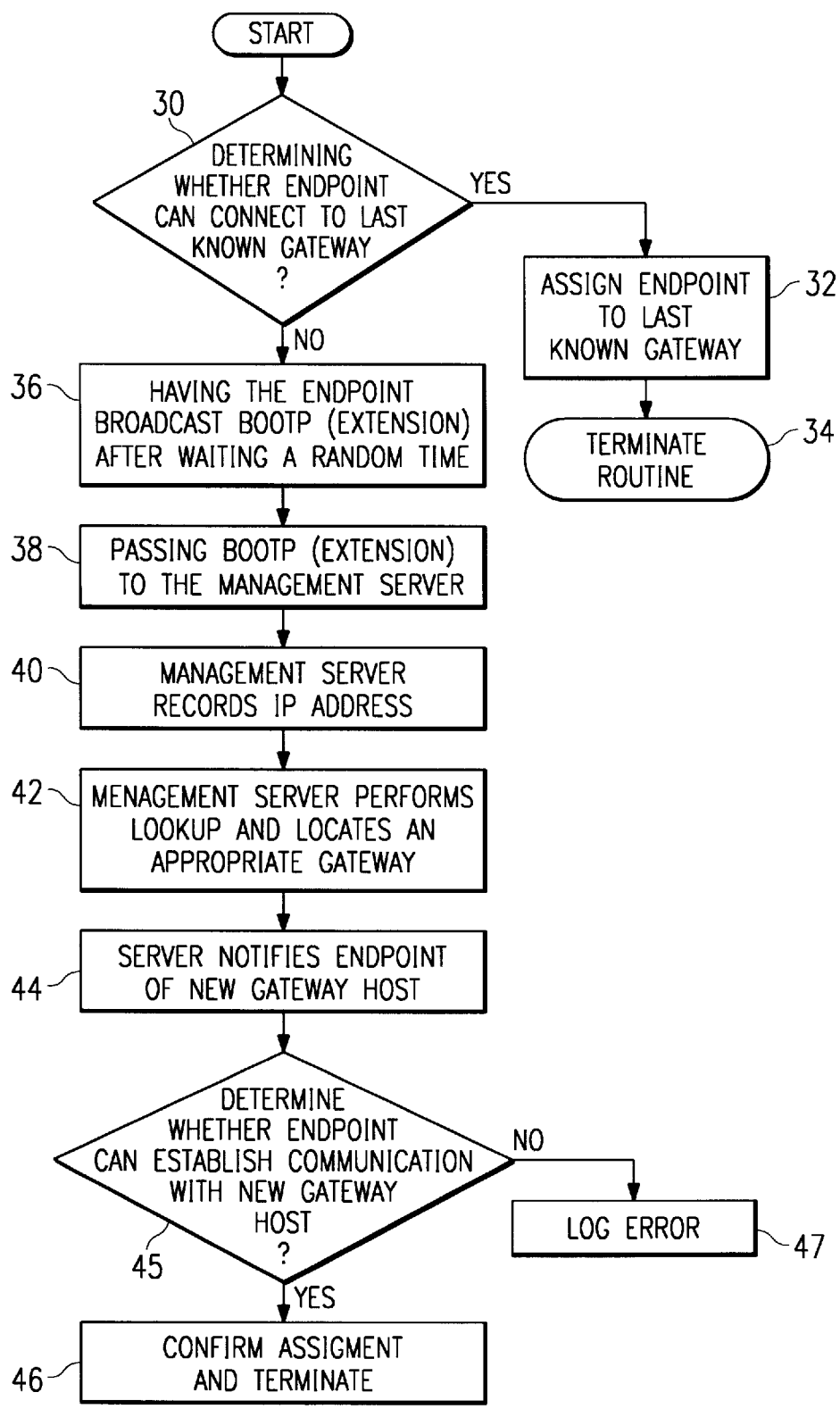
FIG. 4 is a flowchart illustrating a preferred method of reconfiguring an endpoint machine in the enterprise environment of FIG. 1.

Referring now to FIG. 4, a flowchart is shown of a preferred method of reconfiguring a dynamic network environment. As discussed above and illustrated in FIG. 1, the environment is organized into one or more managed regions, each region being managed by the management server 14 servicing one or more gateway machines, and each gateway machine services a set of (e.g., one or more) endpoint machines. System management tasks are normally initiated at a central location (usually the management server or a particular gateway) and distributed to all endpoint machines in the region (if not in the entire network). The method, which is preferably carried out for each endpoint machine upon "start" or so-called power-up, begins at step 30 by determining whether the particular endpoint machine can connect to a last known gateway machine upon power-up. Although not meant to be limiting, typically "start" or "power-up" refers to the initialization or reset of the client component of the system management framework, although the term may be construed to cover restart of the computer (as might occur in a cold boot). Moreover, preferably the particular endpoint "can connect" to the last known gateway if can establish communications therewith; thus, the "connection" is not limited to a physical connection but should be broadly construed to cover any "logical" connection of the devices.

If the outcome of the determination at step 30 is positive, then the routine continues at step 32 to assign the endpoint machine to the last known gateway for purposes of system management. The routine then terminates at step 34.

There are any number of circumstances that will cause the outcome of the test at step 30 to be negative. This will occur, for example, when the endpoint machine is relocated within the network environment (which is an especially common occurrence with smaller machines, such as notebook computers). Another reason might be that the network configuration itself has changed at a higher level. Still other possibilities are that the last known gateway machine is inoperative or that local configuration files in the endpoint machine have been lost or corrupted. There are a myriad of other reasons as well, although the above list is representative.

When the outcome of the test at step 30 is negative, the routine continues at step 36 by having the endpoint machine broadcast a boot request BOOTP after a random time. Normally, such a boot request would be serviced by one or more servers in the network including, for example, a dedicated boot server. However, in accordance with the present invention, the boot request is provided with an "extension" unique to the management server. In particular, the boot request has certain required fields as well as one or more "open" fields, and these latter fields are useful for "vendor-specific" services (such as provided by the invention). All other servers in the network in effect "ignore" the boot request due to the extension, which is preferably selectable in any predetermined manner. As used herein, the other servers "ignore" the reconfiguration boot request by merely not responding to the request; this term is not meant to imply that the servers do not receive the boot request, as one or more of the servers usually will receive it.

At step 38, the management server 14 receives the boot request (either directly or as a result of the boot request being passed thereto from a gateway machine that may have "heard" the request). At step 40, the management server records a current IP address of the endpoint machine. At step 42, the management server locates a new gateway machine for the endpoint based on the current IP address. Typically, the new gateway machine will be the machine that is "closest" to the IP address, although this is not required. At step 44, the management server issues a notification to the endpoint machine identifying a location of the new gateway machine.

After the new gateway host is assigned, preferably the endpoint repeats the connection "protocol" with respect to the new host to confirm the mutuality of the connection. In particular, at step 45 at test is made to determine whether the endpoint can connect to the last known gateway (as in step 30), and in this case the last known gateway is the new host. If the result of the test at step 45 is positive, the routine terminates at step 46 with respect to this particular endpoint machine. On the other hand, if the result of the test at step 45 is negative, appropriate errors are logged at step 47 and the endpoint gives up. The second "connect" test (at step 45) establishes the existence (or lack thereof) of mutual connectivity, and a positive test result provides an indication to each side that both machines have a good address for the other party. This avoids a common problem in distributed computing environments where machine A can talk to machine B, but machine B cannot talk to machine A. In the preferred embodiment, the connection either works both ways or is considered invalid (with respect to one or more of the endpoints). The routine illustrated in FIG. 4 is repeated for any endpoint upon power-up, as necessary.

If the process is successful, the endpoint machine is assigned to the new gateway machine to facilitate execution of the system management tasks within the managed region. As noted above, such tasks are typically carried out by commands issued from a central location (e.g., the management server or one of the gateway machines) and distributed to all endpoints within the managed region, including the endpoint machine newly-configured in the manner illustrated in the flowchart of FIG. 4.

The above-described technique is advantageous as it makes the endpoint largely immune to reconfiguration trouble or errors. As the number of endpoints increases into the thousands of machines, the potential for boot server overload is ameliorated because of the random time delay (in step 36) inserted by the endpoint machine prior to broadcasting the boot request. Of course, the time delay may be selectable, or it may be omitted altogether. Since only those endpoints that cannot connect to their last known gateway use the protocol in any event, it is unlikely that thousands of endpoints will need reconfiguration service at any one time. But even if this were to occur, the random delays (when implemented) ensure that network servers (including the boot server, which receives but does not respond to the special boot request) do not get overloaded. If desired, one or more gateway machines may be dedicated to the reconfiguration protocol, although typically this will be unnecessary.

Preferably, gateway machines are programmed to "listen" for BOOTP requests (having the unique extension) broadcast from lost endpoint machines (i.e. machines that are not presently attached to the gateway). Whenever such a request is heard, it is passed to the management server for processing in the manner previously described. Of course, other variations are possible. Thus, e.g., it may be desirable to have gateway machines programmed to "listen" for some message or other indication that a particular endpoint has been turned off or has been otherwise removed from some existing location. This would be desirable in a load balancing scheme where the system is designed to compensate for load variations based on the number or configuration of endpoints relative to a particular gateway.

The client-class framework running on each endpoint is a low-maintenance, low-cost framework that is ready to do management tasks but consumes few machine resources (because it is normally in an idle state). As noted above, each endpoint is "dataless" in the sense that system management data is not stored therein before or after a particular system management task is implemented or carried out. This architecture advantageously enables a rational partitioning of the enterprise with 10's of servers, 100's of gateway machines, and 1000's of endpoints. Each server typically serves up to 200 gateways, each of which services 1000's of endpoints. At the framework level, all operations to or from an endpoint pass through a gateway machine. In many operations, the gateway is transparent; it receives a request, determines the targets, resends the requests, waits for results, then returns results back to the caller. Each gateway handles multiple simultaneous requests, and there may be any number of gateways in an enterprise, with the exact number depending on many factors including the available resources and the number of endpoints that need to be serviced.

Figure 5:
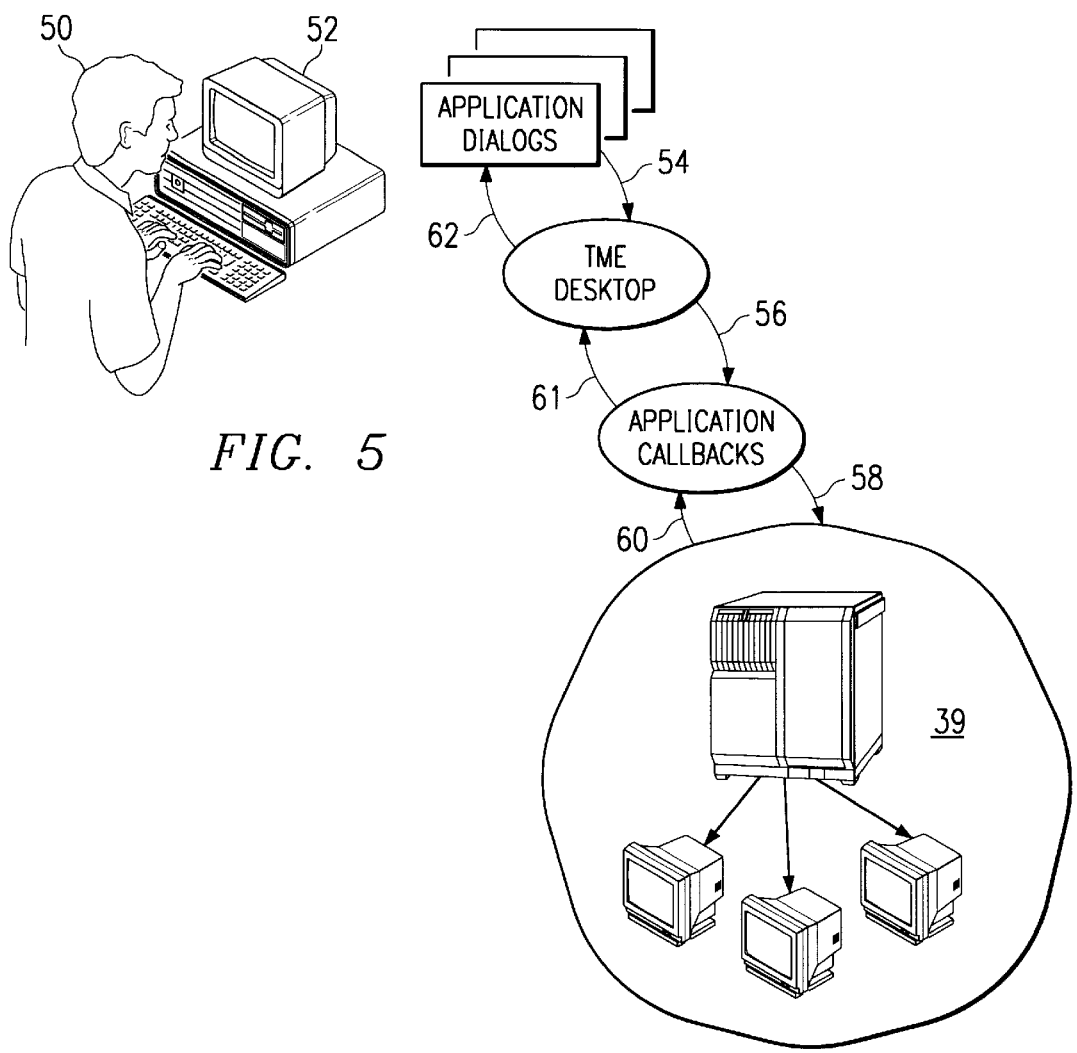
FIG. 5 shows a simplified representation of how a system administrator implements a system management task.

FIG. 5 illustrates how a systems management task is implemented. Each authorized administrator 50 has access to a desktop computer 52 containing one or more icons representing system resources. As administrators interact with dialog screens and menus available from these icons, they are able to change system configurations and manage new resources in the distributed environment, all in a known manner. In particular, when administrator 50 interacts with the desktop, so-called "callbacks" are invoked from the user interface on underlying objects representing some system resource or component. These callbacks are translated into a series of method invocations that actually perform the work and return and results or status to the administrator.

In particular, and with reference to the process flow diagram of FIG. 5, the information flow begins when the administrator 50 selects an icon or interacts with a dialog. The information is then sent to the desktop (usually located at a gateway) at step 54, at which time the appropriate application callback method is invoked at step 56. The callback method then invokes core application methods at step 58, which communicate with the application object(s) to perform some system management operation, as illustrated at step 39. Any return information or state is passed back at steps 60 and 61. If an update to the user interface is required, the desktop 52 interprets the output and updates the dialogs on the administrator's desktop at step 62.

Preferably, the framework includes a task library that enables administrators to create "shell" scripts that can run on any managed node of the enterprise environment. A shell script integrated with a managed node is called a "task." When administrators want to create a task, they provide a machine and a path to an executable file. The executable can be a shell script, a specialized script, a compiled program or any other kind of valid executable. When a task is created, the executable is stored as an attribute in an object database associated with a gateway machine. When the task is needed, the executable file is retrieved from the attribute and is provided to one or more managed nodes. After a task is created, it is added to the task library and displayed as an icon.

As referenced above, the systems management environment provides an implementation of a CORBA 1.1 Object Request Broker (ORB), basic object adaptor (BOA), and related object services. CORBA 1.1 is a specification for an object-oriented distributed computer systems management architecture provided by The Object Management Group (OMG), a non-profit association of more than 300 companies. CORBA describes the use of the Object Request Broker (ORB) and basic object adaptor (BOA) that provide a mechanism for object invocation and return of results. The specification defines interfaces to a set of low-level object services and enables such services to be integrated in many different language and systems using object encapsulation, service requestor/provider isolation, and interface and implementation separation.

Figure 6:
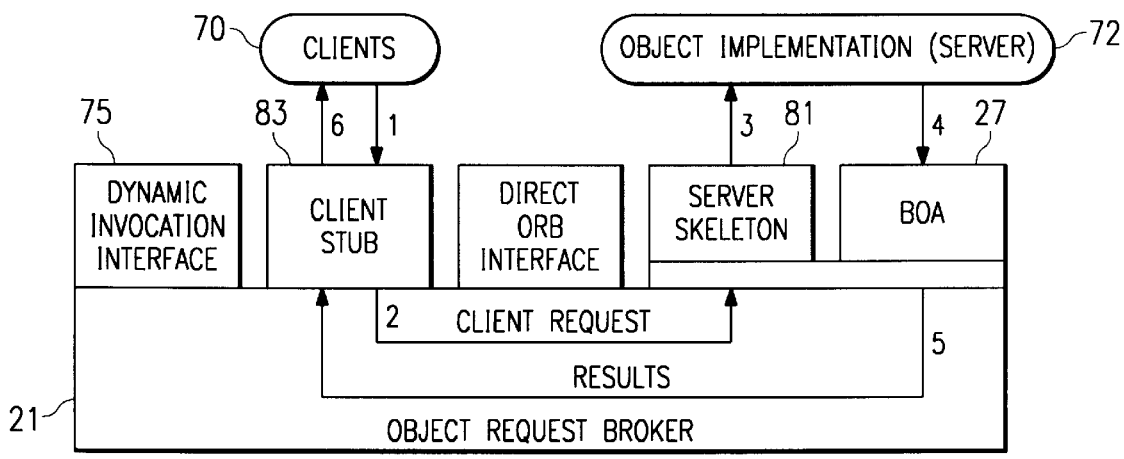
FIG. 6 illustrates the ORB/BOA object-invocation mechanism used by the present invention.

In a CORBA 1.1 implementation as seen in FIG. 6, there are three primary components: a client, an object implementation, and the ORB/BOA. The client 70 is the requestor of a service that is provided by an object implementation 72. The ORB 21 delivers the request from the client 70 to the object implementation 72 through the BOA 27. The object implementation 72 then performs the requested service, and any return data is delivered back to the client. The client and object implementation are isolated from each other, and neither has any knowledge of the other except through their ORB/BOA interfaces. Client requests are independent of the object implementation location and the programming language in which they are implemented.

The ORB delivers the request to the BOA, which activates the process under which the object implementation (e.g., a server) runs. The BOA then invokes the method associated with the request by way of a server skeleton 81. When the method is finished, the BOA manages the termination of the method and coordinates the return of any results to the client. Alternatively, if a request is unknown until runtime, a Dynamic Invocation Interface (DII) 75 is used to build a request used in place of a client stub 83 linked at compile time.

One of the preferred implementations of the client component of the system management framework (including the reconfiguration mechanism) is as a set of instructions in a code module resident in the random access memory of the endpoint. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims. The present invention, however, is not to be construed as limited to reconfiguration of endpoint machines, but may also be useful for reconfiguring the gateway machines as well. Moreover, the inventive reconfiguration technique should be useful in any distributed network environment.

In the preferred method of the invention as discussed above, a determination is made whether an endpoint machine can establish communication with a first gateway machine upon power-up, e.g., generally the "reset" or "initialization" of a client component of a system management framework running on the endpoint. If a logical connection cannot be established, the endpoint broadcasts a boot request with a unique extension, and the management server for the region then assigns the endpoint to a "second" gateway machine. Normally, the first and second gateway machines are different, but this is not a requirement as the first and second gateway machines may actually end up being the same. Moreover, after the assignment, the connection (between the endpoint and the second machine) is preferably re-tested to ensure mutual connectivity before communications begin.

Having thus described my invention, what I claim as new and desire to secure by Letters Patent is set forth in the following claims:

1. A method of reconfiguring a dynamic network environment having a management server servicing a set of gateway machines, each of which is associated with a set of endpoint machines, comprising the steps of:

determining whether an endpoint machine can establish communication with a first gateway machine upon power-up;

if the endpoint machine cannot establish communication with the first gateway machine upon power-up, having the endpoint machine broadcast a boot request with an extension unique to the management server; and having the management server respond to the boot request by assigning the endpoint machine to a second gateway machine to facilitate execution of system management tasks within the managed region.

2. The method as described in claim 1 wherein the first gateway machine is a last known gateway machine to which the endpoint was connected.

3. The method as described in claim 1 further including the step of assigning the endpoint machine to the first gateway machine if the endpoint machine can establish communication with the first gateway machine upon power-up.

4. The method as described in claim 1 wherein the step of having the management server respond to the boot request includes the steps of:

recording a current IP address of the endpoint machine; and identifying the second gateway machine based on the current IP address of the endpoint machine.

5. The method as described in claim 1 wherein the boot request is normally serviced by a boot server in the network but is ignored by the boot server because of the extension.

6. The method as described in claim 5 further including the step of having the endpoint machine wait for a random time before broadcasting the boot request so that the boot server does not receive multiple boot requests having the extension at the same time.

7. The method as described in claim 1 wherein the endpoint machine is a notebook computer that cannot connect to the first gateway machine because the notebook computer has been relocated within the dynamic network environment.

8. The method as described in claim 1 wherein the endpoint machine cannot establish communication with the first gateway machine because the endpoint machine has been relocated within the dynamic network environment, because a configuration of the dynamic network environment has changed, because the first gateway machine is inoperative or because local configuration files have been deleted from the endpoint machine.

9. A method of reconfiguring a dynamic network environment having a management server servicing a set of gateway machines, each of which service a set of endpoint machines, and wherein a system management task is normally initiated at a central location and distributed to all endpoint machines, comprising the steps of:

determining whether an endpoint machine can establish communication with a first gateway machine upon a predetermined occurrence;

if the endpoint machine can establish communication with the first gateway machine upon the predetermined occurrence, connecting the endpoint machine to the first gateway machine;

if the endpoint machine cannot establish communication with the first gateway machine upon the predetermined occurrence, having the endpoint machine broadcast a boot request with an extension unique to the management server;

having the management server respond to the boot request by assigning the endpoint machine to a second gateway machine; and verifying that the endpoint machine can establish communication with the second gateway machine prior to execution of the system management task within the managed region.

10. The method as described in claim 9 wherein the step of having the management server respond to the boot request includes the steps of:

recording a current IP address of the endpoint machine;

identifying the second gateway machine based on the current IP address of the endpoint machine; and notifying the endpoint machine of a location of the second gateway machine.

11. The method as described in claim 9 wherein the boot request is normally serviced by a boot server in the network but is ignored by the boot server because of the extension.

12. The method as described in claim 11 wherein the boot request is BOOTP.

13. The method as described in claim 9 wherein the extension is selectable.

14. The method as described in claim 9 wherein the first and second gateway machines are the same.

15. In a large distributed enterprise having a management server servicing a set of gateway machines, each of which services a set of endpoint machines, a method of reconfiguring a dynamic network environment, comprising the steps of:

for each endpoint machine at power-up, determining whether the endpoint machine can connect to a last known gateway machine;

if the endpoint machine cannot connect to the last known gateway machine upon power-up, having the endpoint machine broadcast a boot request with an extension unique to the management server but that is ignored by at least a boot server in the enterprise; and having the management server respond to the boot request by assigning the endpoint machine to a new gateway machine to facilitate execution of the system management tasks within the managed region.

16. The method as described of claim 15, wherein the step of having the management server respond to the boot request includes the steps of:

recording a current IP address of the endpoint machine;

identifying the new gateway machine based on the current IP address of the endpoint machine; and notifying the endpoint machine of a location of the new gateway machine.

17. The method as described in claim 15, further including the step of having each endpoint machine wait for a random time before broadcasting the boot request so that the boot server does not receive multiple boot requests having the extension at the same time.

18. A computer connectable into a large distributed enterprise having a management server servicing a set of gateway machines, each of which services a set of endpoint machines, the computer comprising:

a processor;

an operating system; and a reconfiguration mechanism, comprising:

means responsive to a predetermined start condition of the computer for determining whether the computer can establish communication with a first gateway machine;

means responsive to the determining means for broadcasting a boot request with an extension unique to the management server if the computer cannot establish communication with the first gateway machine upon the predetermined start condition; and means responsive to information received from the management server for assigning the computer to a second gateway machine to facilitate execution of system management tasks within the managed region.

19. The computer as described in claim 18 wherein the reconfiguration mechanism further includes for verifying that the endpoint can establish communication with second gateway machine prior to executing a system management task.

20. A computer program product for use in a computer having a processor, a memory, and means for connecting the computer into a large distributed enterprise having a management server servicing a set of gateway machines, each gateway machine servicing a set of endpoint machines, the computer program product comprising:

a computer-readable storage medium having a substrate; and program data encoded in the substrate of the computer-readable storage medium, wherein the program data comprises:

means responsive to power-up of the computer for determining whether the computer can connect to a first gateway machine;

means responsive to the determining means for broadcasting a boot request with an extension unique to the management server if the computer cannot connect to the first gateway machine upon power-up; and means responsive to information received from the management server for assigning the computer to a second gateway machine to facilitate execution of system management tasks within the managed region.

* * * * *